United States Patent
Saraydar

(12) 
(10) Patent No.: US 6,272,717 B1
(45) Date of Patent: Aug. 14, 2001

(54) SINGLE PIVOT WINDSHIELD WIPER ATTACHMENT APPARATUS

(76) Inventor: Michael Saraydar, 241 Irving Ave., Closter, NJ (US) 07624

( * ) Notice: Subject to any disclaimer, the term of this patent is extended or adjusted under 35 U.S.C. 154(b) by 0 days.

(21) Appl. No.: 09/296,734

(22) Filed: Apr. 22, 1999

Related U.S. Application Data

(63) Continuation-in-part of application No. 08/790,341, filed on Jan. 27, 1997, now Pat. No. 5,946,765.

(51) Int. Cl.$^7$ .................................. B60S 1/28; B60S 1/40
(52) U.S. Cl. ..................................... 15/250.32; 15/250.41; 15/250.23
(58) Field of Search ........................... 15/250.32, 250.23, 15/250.41, 250.13, 250.4, 250.39, 250.361

(56) References Cited

U.S. PATENT DOCUMENTS

| | | | |
|---|---|---|---|
| 2,587,168 | * | 2/1952 | Kessler ................................ 15/250.23 |
| 2,821,735 | * | 2/1958 | Perkins et al. ..................... 15/250.23 |
| 3,453,679 | * | 7/1969 | Thorlahson ........................ 15/250.23 |
| 3,466,694 | * | 9/1969 | Feldstein ............................ 15/250.23 |
| 3,874,019 | * | 4/1975 | Speth .................................. 15/250.32 |
| 4,208,759 | * | 6/1980 | Nixon et al. ....................... 15/250.32 |
| 4,553,283 | * | 11/1985 | Speth .................................. 15/250.32 |
| 5,946,765 | * | 9/1999 | Saraydar ............................. 5/250.32 |

FOREIGN PATENT DOCUMENTS

| | | | |
|---|---|---|---|
| 2305239 | * | 8/1973 | (DE) .................................. 15/250.23 |
| 2415180 | * | 10/1975 | (DE) .................................. 15/250.23 |
| 2305323 | * | 10/1976 | (FR) .................................. 15/250.23 |

* cited by examiner

*Primary Examiner*—Gary K. Graham
(74) *Attorney, Agent, or Firm*—Sofer & Haroun, LLP

(57) ABSTRACT

A wiper apparatus employed in a windshield wiper system for supporting a pair of wiper elements via a wiper drive arm pivotably mounted proximate a vehicle windshield. The wiper apparatus comprises a drive arm attachment member adapted to be coupled with the wiper drive arm. In one embodiment, a pivot arm is pivotably secured to the drive arm attachment member about a pivot axis which intersects the windshield. The pivot arm is configured to carry the pair of wiper elements such that each of the wiper elements moves over a corresponding first arcuate path when the drive arm is rotated in a first direction and moves over a corresponding second arcuate path when the drive arm is rotated in an opposite direction. Each of the first and second paths of a first wiper element is different from each of the first and second paths of a second wiper element. In one embodiment, each of the wiper elements moves between a corresponding upper position when the drive arm is rotated in the first direction, and a corresponding lower position when the drive arm is rotated in the opposite direction. In another embodiment, each of the wiper elements moves between a corresponding first angular position when the drive arm is rotated in the first direction, and a corresponding second angular position when the drive arm is rotated in the opposite direction.

18 Claims, 7 Drawing Sheets

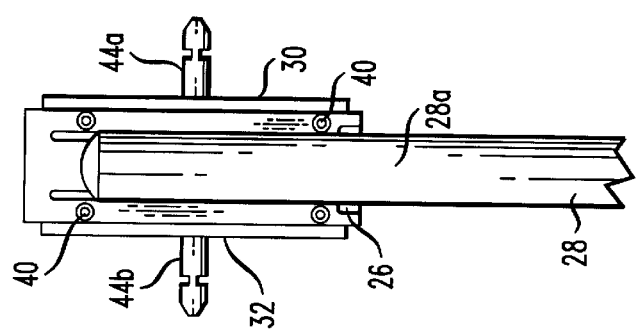
FIG. 6
FIG. 5
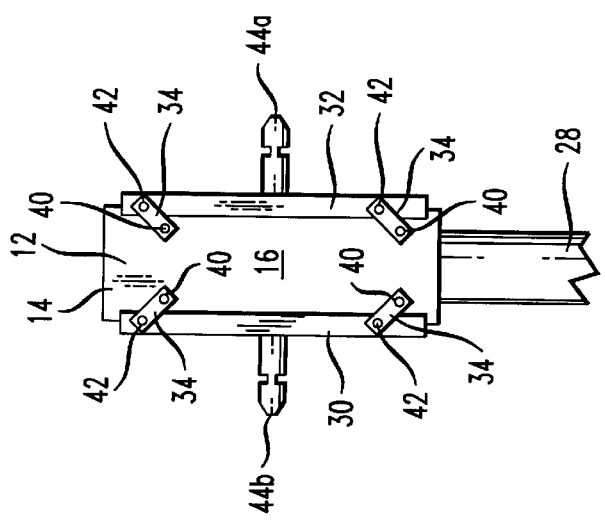
FIG. 4

VIEW A-A

SINGLE PIVOT WINDSHIELD WIPER ATTACHMENT APPARATUS

This is a continuation-in-part of application Ser. No. 08/790,341 filed on Jan. 27, 1997, now U.S. Pat. No. 5,946,765.

FIELD OF THE INVENTION

This invention relates generally to a windshield wiper attachment apparatus, and in particular, to a windshield wiper attachment member which provides improved wiping performance of a windshield by utilizing two parallel wiper blades spaced apart and pivotally connected to a windshield wiper driving arm.

BACKGROUND OF THE INVENTION

The provision of two parallel windshield wiper blades secured on a single windshield wiper driving arm is well known in the art.

U.S. Pat. No. 2,158,254 discloses a windshield wiper provided with two or more wiping elements, each of which are separately mounted to the vehicle at two spaced pivot points proximate the windshield, and which are powered by separate motors integral with the vehicle's electrical system. The wiper elements move across approximately the same area of the windshield surface but move in different or intersecting paths so that streaks which may be left by the first wiping element will be wiped off by the second wiping element which follows closely behind the first but which moves along a different path. The two wiper elements are, however, connected to each other by a link which restricts their movement back and forth and which limits the area of the windshield over which the wipers pass.

U.S. Pat. No. 2,605,491 teaches a windshield wiper comprising two wiper elements spaced apart and arranged parallel one another on a cross-head bracket which is in turn connected with the free end of an operating arm having a pivotal center. The wipers are arranged on the cross-head bracket such that the overall length of arcuate sweep of the wiper elements is increased in an attempt to clear the maximum area on the windshield. The wiper elements are, however, attached to the cross head brackets by a swivel which does not limit the rotation of the wipers thereon. As such, the wiper elements are left to randomly shift on the swivel as the operating arm moves back and forth across the window. As a result of the swivel attachment and resulting random shifting of the wiper elements, large areas of the windshield are often neglected. Additionally, the swivel attachment is prone to becoming stuck, thereby fixing the wiper elements in a single position.

In U.S. Pat. No. 2,607,944 discloses a combination windshield wiper for cleaning the surface of a windshield and which comprises a pivotally mounted reciprocating wiper arm with a wiper mounted in operative position on the outer end thereof, and a second wiper mounted opposite the first wiper and attached to the end of a telescoping rod wherein the outer end of the second wiper is provided with rollers adapted to travel within the groove of a track along the top edge of the windshield. The rollers may, however, become stuck within the groove of the track thereby preventing the wipers from moving across the windshield.

U.S. Pat. No. 3,874,019 teaches a windshield wiper driving arm having an adapter for mounting two parallel wipers on a single windshield wiper driving arm for providing improved cleaning of a windshield. The adapter being configured to allow total arm pressure to be divided substantially equal between the two wiper blades during wiping. This device, however, permits wiping in only a fixed area of the windshield.

In U.S. Pat. No. 4,553,283, there is disclosed a windshield wiper adapter provided with two windshield wiper blades attached thereto, and which tilts the wiper blades in the sweep movement direction as the wiper blades are swept across the surface of a windshield. This device, however, permits wiping in only a fixed area of the windshield and requires complicated adjustments to the adapter to control the tilting of the wiper blades.

Thus, there is a need for a windshield wiper attachment apparatus which provides improved wiping ability over a large area of a windshield, which is inexpensive, as well as simple to attach and adjust. Additionally, there is a need for a windshield wiper attachment apparatus which is easily replaceable, which does not require any electrical wiring or additional connection to the vehicle, and which overcomes the problems inherent in the prior art.

OBJECTS AND SUMMARY OF THE INVENTION

It is thus a general object of the present invention to provide a windshield wiper attachment apparatus capable of providing improved cleaning of and enhanced visibility through a vehicle's windshield.

Another object of the invention is to provide a windshield wiper attachment apparatus configured for securing two wiper elements and detachably mounting the attachment member on a wiper drive arm which is attached to the vehicle's windshield at a single pivot point.

A more specific object of the present invention is to provide a windshield wiper attachment member for mounting two wiper elements to a drive arm attachment member and detachably mounting the same upon a wiper drive arm such that the mounting of the wiper elements provides for improved wiping coverage of a windshield.

The present invention, in accordance with one embodiment, relates to a wiper apparatus employed in a windshield wiper system. Advantageously, the wiper apparatus is configured to support a pair of wiper elements via a wiper drive arm pivotably mounted proximate a vehicle windshield. The wiper apparatus comprises a drive arm attachment member adapted to be coupled with the wiper drive arm. In one embodiment, a pivot arm is pivotably secured to the drive arm attachment member about a pivot axis which intersects the windshield. The pivot arm is configured to carry the pair of wiper elements such that each of the wiper elements moves over a corresponding first arcuate path when the drive arm is rotated in a first direction and moves over a corresponding second arcuate path when the drive arm is rotated in an opposite direction. Each of the first and second paths of a first wiper element is different from each of the first and second paths of a second wiper element.

In one embodiment, each of the wiper elements moves between a corresponding upper position when the drive arm is rotated in the first direction, and a corresponding lower position when the drive arm is rotated in the opposite direction. In another embodiment, each of the wiper elements moves between a corresponding first angular position when the drive arm is rotated in the first direction, and a corresponding second angular position when the drive arm is rotated in the opposite direction.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views:

FIG. 4 illustrates an enlarged bottom sectional view of a double pivot attachment member in accordance with one embodiment of the present invention;

FIG. 5 illustrates an enlarged top sectional view of a double pivot attachment member in accordance with one embodiment of the present invention;

FIG. 6 illustrates an alternative embodiment of the present invention illustrating an alternative manner of mounting pivot members upon attachment member;

DETAILED DESCRIPTION OF THE PRESENTLY PREFERRED EMBODIMENT

Figure 1:
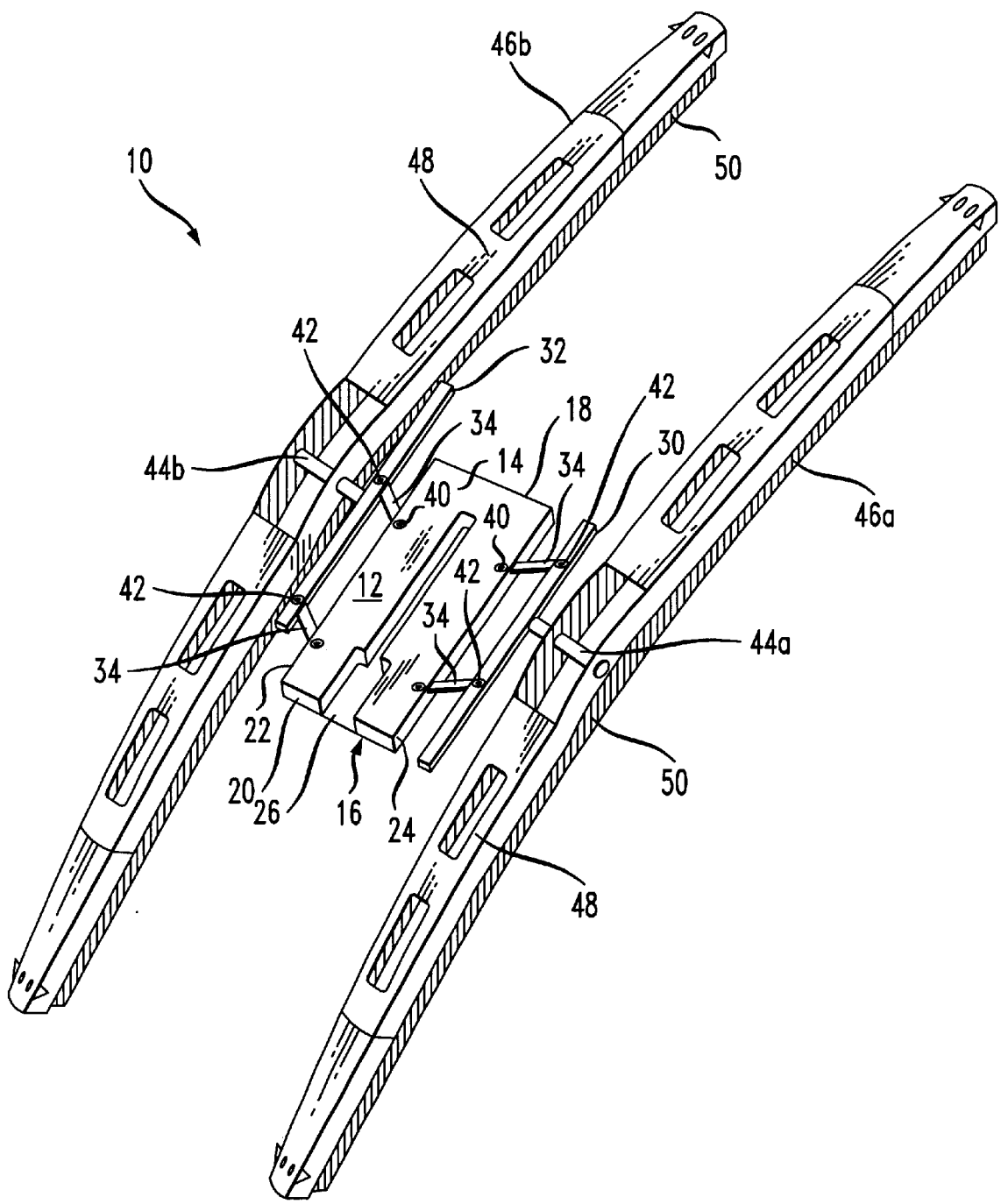
FIG. 1 illustrates a perspective view of a double pivot windshield wiper attachment apparatus constructed in accordance with one embodiment of the present invention and having two windshield wiper elements mounted thereon.
Figure 2:
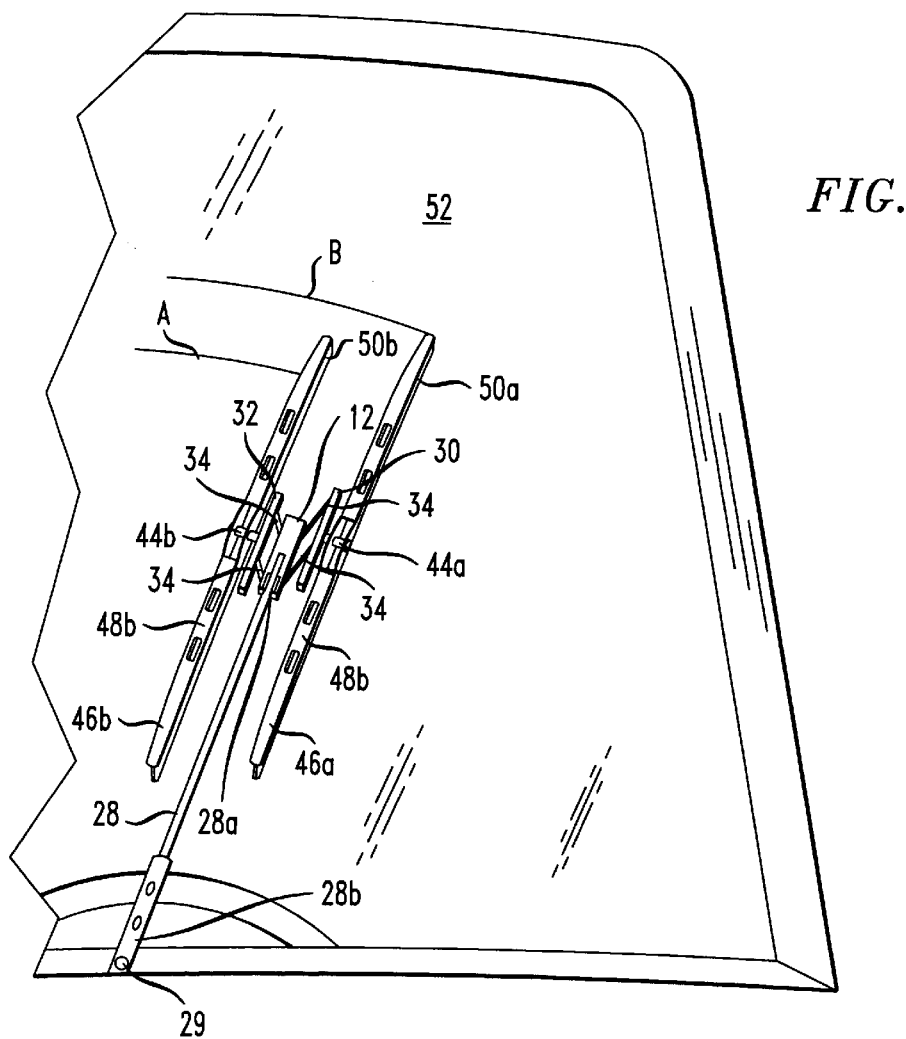
FIG. 2 illustrates a partial front view of a vehicle windshield including a double pivot windshield wiper attachment apparatus constructed in accordance with one embodiment of the present invention and connected to a conventional windshield wiper drive arm.

With initial reference to FIG. 1, a double pivot windshield wiper attachment apparatus 10 is shown according to one embodiment of the present invention. Windshield wiper attachment apparatus 10 includes a drive arm attachment member 12, having an upper surface 14 and a lower surface 16. Drive arm attachment member 12 is further defined by a top end 18, a bottom end 20, and first and second sidewalls 22, 24. A windshield wiper drive arm receiving portion 26 is advantageously mounted upon upper surface 14 of drive arm attachment member 12 and extends toward bottom end 20 of drive arm attachment member 12. A conventional vehicle windshield wiper drive arm 28 (shown in FIG. 2) may be releasably secured at a first end 28a to receiving portion 26 via any releasably securable method of connection such as by screwing or by interlocking snaps. At a second end 28b, drive arm 28 is rotatably attached to a vehicle at swivel point 29 as illustrated in FIG. 2. Drive arm 28 will actuate back and forth upon swivel point 29 across windshield 52 as is well known in the art. Swivel point 29 is preferably controlled via a motor (not shown) which is attached to the vehicle's electrical system, although the invention is not limited in this respect and other methods of controlling swivel point 29 may be employed without detracting from the invention. Additionally, the invention is not limited in the manner by which drive arm 28 is secured to receiving portion 26 of drive arm attachment member 12 and may include any of various fixing methods known in the art without detracting from the invention. Furthermore, receiving portion 26 is not limited to being mounted upon upper surface 14 of drive arm attachment member 12, and may be mounted elsewhere on drive arm attachment member 12, such as on lower surface 16.

Figure 9A:
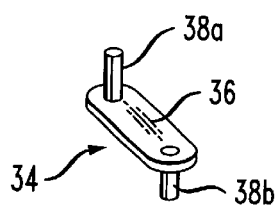
FIGS. 9a and 9b illustrate perspective views of alternative embodiments of pivot members constructed in accordance with the present invention.
Figure 9B:
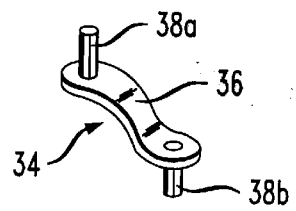

First and second support members 30,32, respectively, are advantageously positioned parallel to first and second sidewalls 22, 24 of drive arm attachment member 12 and are pivotally secured to drive arm attachment member 12 by pivot links or pivot members 34. As shown in greater detail in FIGS. 9a and 9b, a pivot member 34 includes a surface 36, which may be straight (FIG. 9a) or curved (FIG. 9b), and at least two pins 38a, 38b. Pins 38a and 38b extend from surface 36 in opposite directions in separate parallel planes.

As illustrated in FIG. 1, and with greater detail in FIGS. 4 and 5, drive arm attachment member 12 is provided with a pair of pivot points 40 proximate first and second sidewall 22, 24. Additionally, first and second support members 30, 32 are provided with corresponding pivot points 42 which advantageously are aligned with the pivot points 40 of drive arm attachment member 12. Pivot points 40 are configured to receive pivot pins 38a of pivot member 34. Pivot pins 38b are then received in pivot points 42 of first and second support members 30, 32. Pivot pins 38a are advantageously rotatably secured within pivot points 40, 42 and may be secured via any interlocking method known in the art such as by soldering, welding or an interlocking snap mechanism. The invention is not, however, limited to the configuration and arrangement of a pair pivot points 40 proximate first and second sidewalls 22, 24 as discussed above, and alternative configurations may function equally well without detracting from the invention. For example, in an alternative embodiment illustrated in FIG. 6, one pair of pivot points 40 are preferably positioned centrally on drive arm attachment member 12, and configured to receive pivot pins 38b of pivot members 34 therein.

As shown in FIGS. 1–8, first and second support members 30, 32 are further provided with wiper element mounting rods 44a, 44b, respectively, which extend perpendicularly from first and second support members 30, 32 in a direction away from drive arm attachment member 12 when first and second support members 30, 32 are pivotally attached to drive aim attachment member 12 via pivot members 34.

Figure 3:
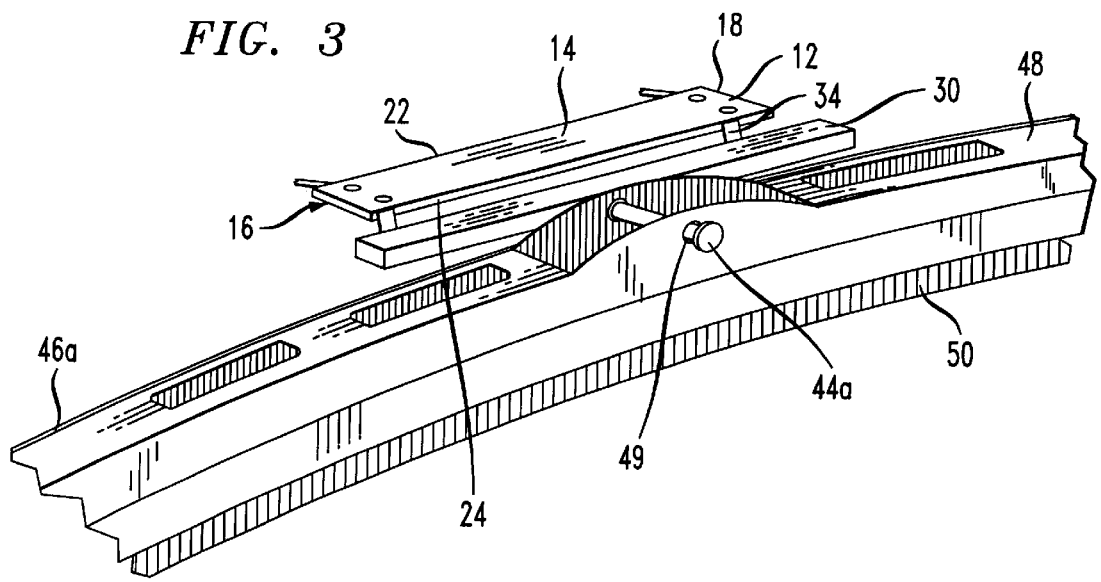
FIG. 3 illustrates a side sectional view of a windshield wiper element and wiper blade mounted upon a mounting rod of a support member in accordance with one embodiment of the present invention.

First and second mounting rods 44a, 44b are configured to receive and releasably secure conventional windshield wiper element 46a and 46b as illustrated in FIG. 1. First wiper element 46a, which can be seen in greater detail in FIG. 3, are of known construction and generally includes a carrier 48 and a rubber blade 50 which is removably attached to carrier 48 which includes a hole 49 (shown in FIG. 3) for receiving first mounting rod 44a therein. Rubber blade 50, which is flexible but sturdy, is disposed against a vehicle windshield 52 as illustrated in FIG. 2, and angled to lean against windshield 52 with sufficient pressure so as to wipe away water, rain and/or snow upon windshield 52, when drive arm 28 rotates drive arm attachment member 12.

It is to be appreciated that the invention is not limited with respect to said pivotal attachment of first and second support members 30, 32 to said drive arm attachment member 12, and said first and second wiper elements 46a, 46b may be pivotally secured directly to said drive arm attachment member 12 by said pivot members 34.

In operation, drive arm 28 will wipe the rubber blades 50 across the windshield in a sweeping back and forth motion as is well known with wiping pressure being applied by a spring (not shown) to retain blades 50 against windshield 52. As drive arm 28 rotates, back and forth, the rubber blades 50 are swept across windshield 52, such that second wiper element 46b in the upper or leading position in FIG. 2, travels in a first arcuate path (indicated by A in FIG. 2) across windshield 52, removing any water, rain, or snow, etc. within its path. Path A followed by second wiper element 46b is random, and differs with each sweep across windshield 52, mainly because of the pivotal securement of first and second wiper elements 46a, 46b to first and second support members 30, 32 of drive arm attachment member 12, and also because of the amount of friction existing on windshield 52.

As drive arm 28 sweeps across windshield 52, pivot members 34 are caused to extend and collapse. The degree of extension and collapse depends upon the material existing upon windshield 52 as well as the friction thereupon. First wiper element 46a which follows behind second wiper element 46b, travels along a second path, indicated as B in FIG. 2, and removes any remaining water, rain, snow or streaks left after the first passing by second wiper element 46b.

Pivot members 34 provide for even greater wiping efficiency since the pivot members 34 allow first and second wiper elements 46a, 46b to freely extend over a range defined by a first vertical position upward to a second vertical position downward as drive arm 28 sweeps wiper elements 46a, 46b back and forth across windshield 52. As such, depending upon the material disposed on windshield 52 as well as the friction created upon windshield 52 by the material, first and second wiper elements 46a and 46b may be capable of providing even greater cleaning capabilities since they may be randomly directed upward and downwards as they travel across windshield 52.

Figure 7:
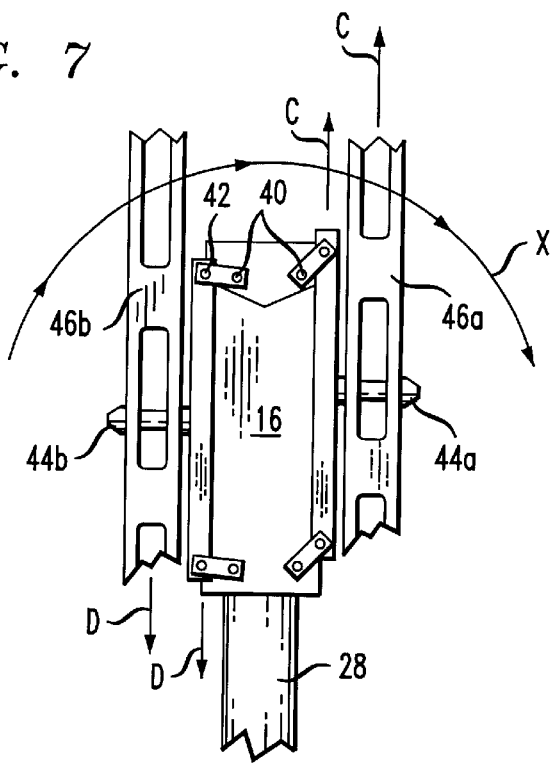
FIGS. 7 and 8 illustrate enlarged bottom sectional views of a double pivot attachment member, in accordance with the present invention herein, illustrating the movement of the support members and wiper elements from a first vertical position to a second vertical position as the windshield wiper driver arm is swept back and forth upon a windshield.
Figure 8:
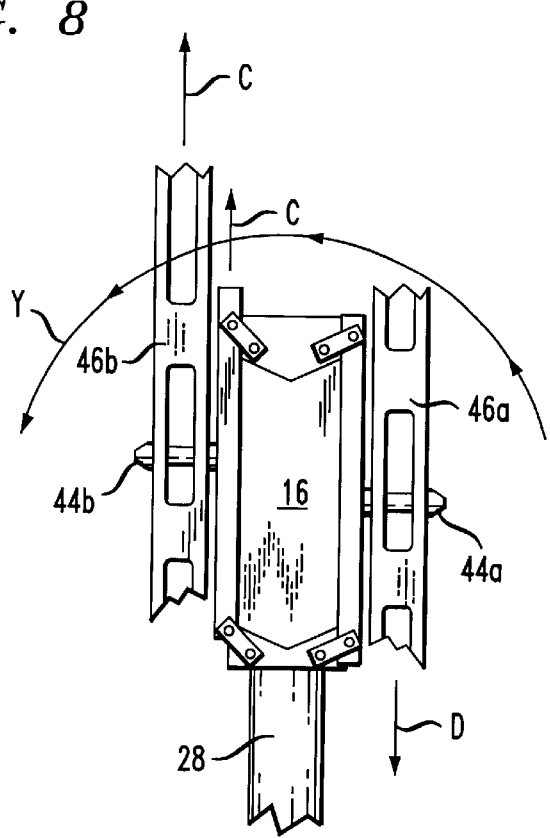

As illustrated in FIGS. 7 and 8, the upward shifting, indicated by arrow C and downward shifting, indicated by arrow D, of wiper elements 46a, 46b alternate as drive arm 28 sweeps back and forth across windshield 52. This upward and downward vertical shifting may be random and is mostly dependent upon the material existing upon windshield 52 and the friction created thereby. Additionally, since the friction created on the windshield may change with each passing of drive arm 28, and as a result of the pivotal securement of first and second wiper elements 46a, 46b and first and second supporting members 30, 32 to drive arm attachment member 12, the random upward and downward shifting of wiper elements 46a and 46b cause wiper elements 46a and 46b to travel along a different arcuate path with each back and forth sweep of drive arm 28.

As indicated in FIG. 7, the movement of drive arm 28 from left to right along path X, causes first wiper element 46a to extend to a first vertical position upward, while second wiper element 46b is directed to a second vertical position downward. In FIG. 8, as drive arm 28 moves in the opposite direction from right to left along a path indicated by Y, first wiper element 46a shifts downward to a second vertical position, while second wiper element 46b shifts upward to a first vertical position. The combination of dual parallel wiper elements with the ability to expand and collapse as well and the ability to be translated over a range defined by a first and second vertical positions while drive arm sweeps back and forth across the windshield, substantially improves and greatly enhances visibility in a rain or snow storm, in addition to providing additional safety afforded by the resultant improvement in vision. The invention is not, however, limited to these shifting paths as described with reference to FIGS. 7 and 8, but may include numerous random paths which are dependant upon the material and friction existing on windshield 52.

Figure 10:
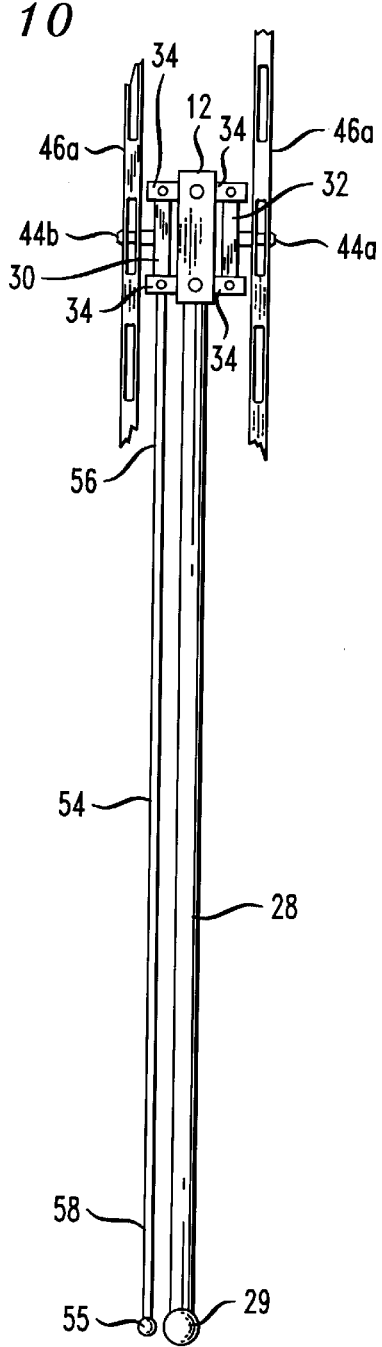
FIG. 10 illustrates an elevational of the double pivot windshield wiper attachment apparatus constructed in accordance with an alternative embodiment of the present invention.

Additionally, the degree of translation of first and second wiper elements 46a, 46b upward and downward may be controlled by placing a stop 43 (shown in FIG. 7) proximate pivot points 40 on lower surface 16 of drive arm attachment member 12, such that pivot members 34 may only extend or be rotated up to certain predetermined point where stop 43 has been positioned FIG. 10 illustrates an alternative embodiment of the present invention which provides for a controlled or fixed path of one of either the first or second wiping elements 46a, 46b. The embodiment of FIG. 9 is provided with all the elements discussed hereinbefore with reference to FIGS. 1–8, with the addition of a separate pivot arm 54 having a first end 56 and a second end 58. Similar to the rotatable attachment of drive arm 28 to the vehicle at swivel point 29, first end 56 of pivot arm 54 is rotatably attached to the vehicle at swivel point 55 proximate swivel point 29, as illustrated in FIG. 9. Second end 58 of pivot arm 54 is attached to either first or second support member 30, 32.

Figure 11:
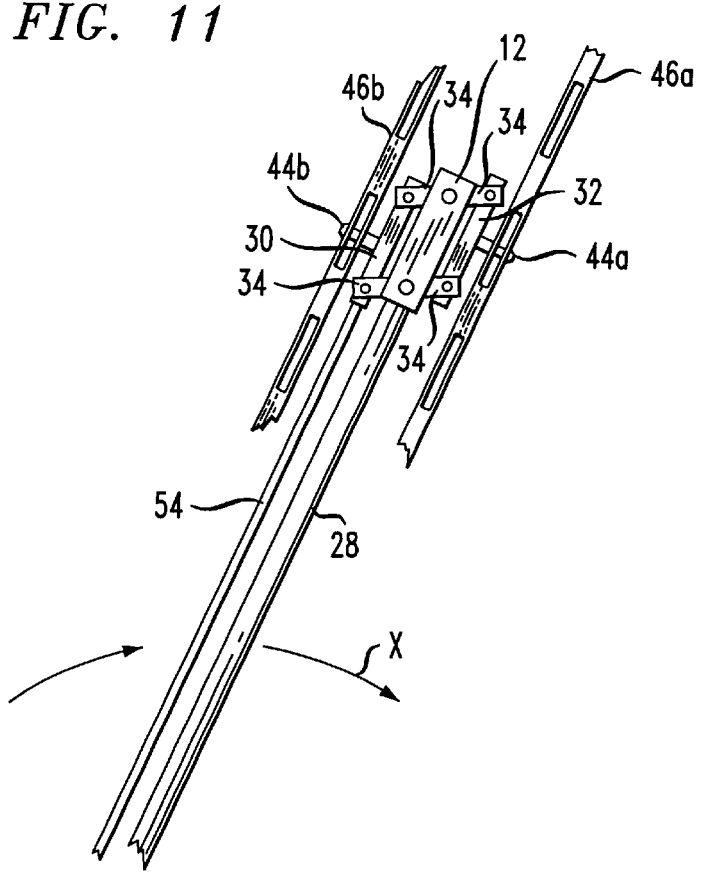
FIG. 11 illustrates an elevational of the double pivot windshield wiper attachment as illustrated in FIG. 10 and shown moving along a path X.

As illustrated in FIG. 11 in which second end 58 of pivot arm 54 is attached to first support member 30, as drive arm 28 is swept from left to right along the path indicated by X, pivot arm 54 "pulls" on first support member 30 causing second wiper element 46b attached to first support element 30 to be directed vertically downward. First wiper element 46a is free to move along its random path depending upon the material and friction existing on windshield 52. As drive arm 28 is directed in the opposite direction from that illustrated in FIG. 11, first wiper element 46a will remain free to travel along its random path. However, pivot arm 54 will now "push" first support member 30 as drive arm 28 moves across windshield 52 from right to left (not shown) thus directing second wiper element 46b to be translated vertically upward. It is to be understood that pivot arm 54 may also be configured to attach to second support member 32, whereby first wiper element 46a be swept back and forth along a fixed path controlled by pivot arm 54, leaving second wiper element 44b to travel along a random path across windshield 52.

Figure 12:
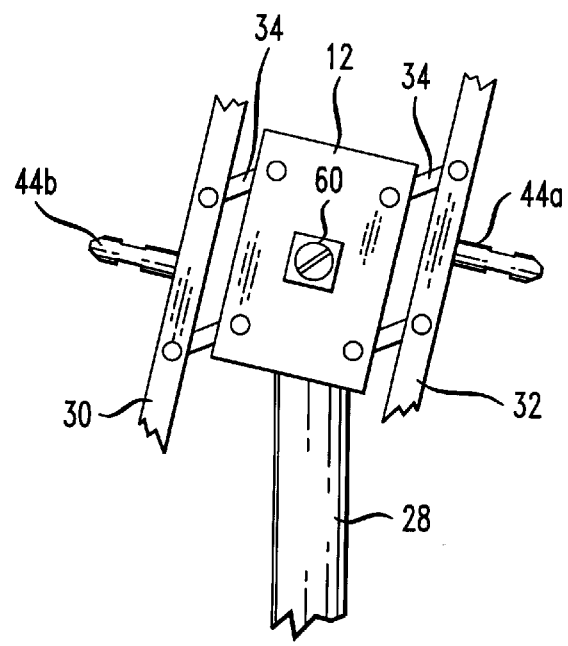
FIG. 12 illustrates another alternative embodiment according to the present invention where the drive arm attachment member is swivellably attached to the drive arm.

In another embodiment of the present invention, as illustrated in FIG. 12, drive arm attachment member 12 is swivellably mounted to drive arm 28 by a screw 60 or some other similar swivel attachment, such that drive arm attachment member 12 may be caused to swivel upon screw 60 as drive arm 28 moves back and forth across windshield 52, in addition to the upward and downward shifting of first and second wiping elements 46a, 46b, thus providing additional paths across windshield 52 over which first and second wiping elements 46a, 46b may travel. The swivellable attachment of drive arm attachment member 12 to drive arm 28, provides even greater wiping ability, thus further enhancing clear visibility through windshield 52.

Figures 13, 14:
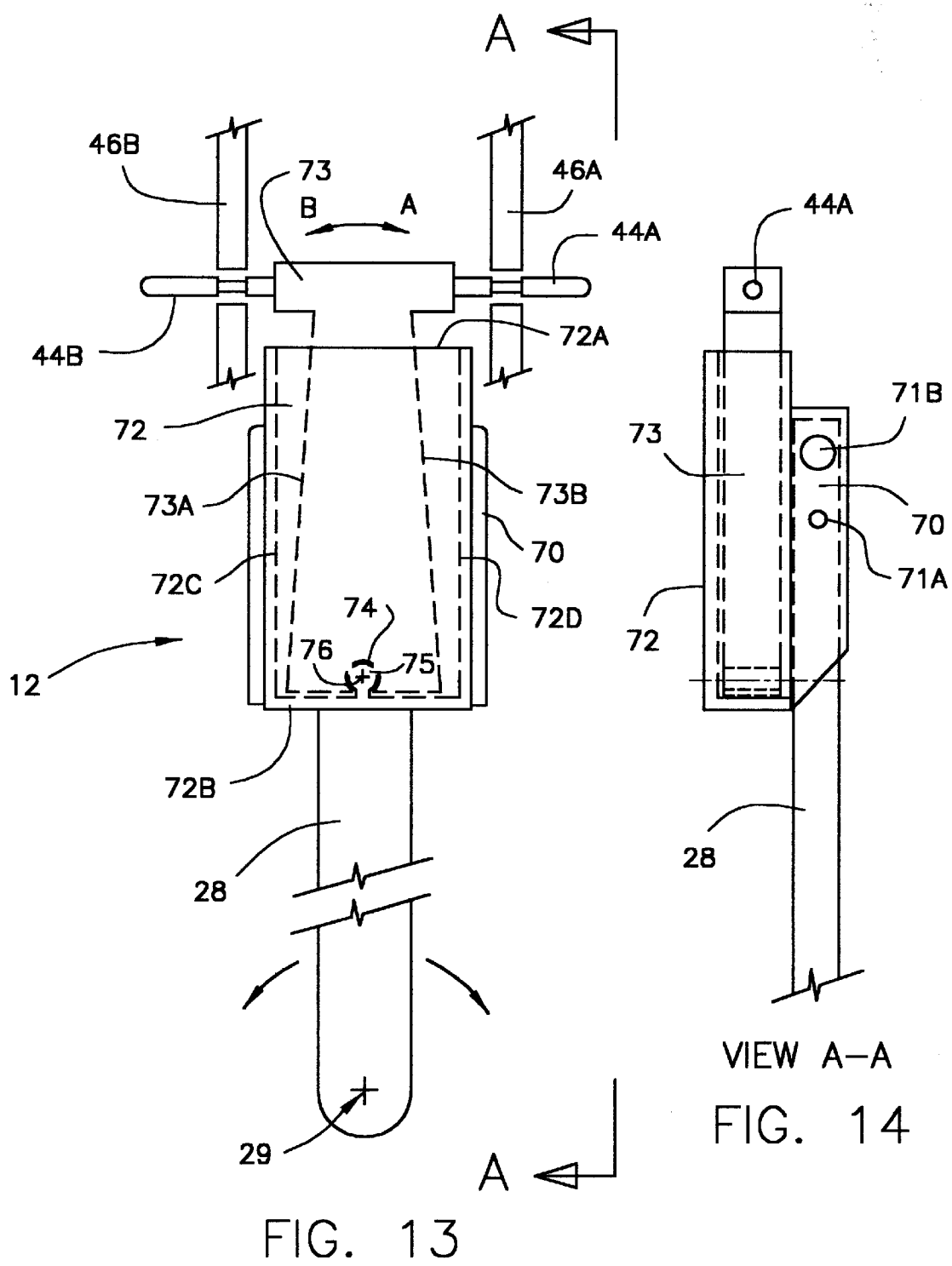
FIGS. 13 and 14 illustrate a windshield wiper apparatus that employs a single pivot, according to one embodiment of the invention.

FIGS. 13 and 14 illustrate, according to one embodiment of the invention, a windshield wiper apparatus that employs a single pivot. In the embodiment shown, drive arm attachment member 12 comprises a drive arm receptacle 70 which is adapted to be coupled to wiper drive arm 28. Preferably, drive arm 28 may be inserted into a slot disposed through drive arm receptacle 70, and is secured in place by pins 71a or 71b or a suitable retaining clip on the drive arm (not shown), although the present invention is not limited in scope by the manner in which drive arm 28 attaches to drive arm attachment member 12.

Attached to drive arm receptacle 70 is housing 72. In a preferred embodiment, drive arm receptacle 70 and housing 72 are integral. Pivot arm 73 is pivotably attached to housing 72 around a pivot point 76, the axis of which intersects the windshield. In the embodiment shown, one end of pivot arm 73 is inserted through open end 72a of housing 72. End 72b of housing 72, which is oppositely disposed relative to end 72a, has pivot 75 that extends from its inner surface. Notch 74 is disposed on the inserted end of pivot arm 73 so as to engage pivot 75.

On the end of pivot arm 73 which is opposite to notch 74 are wiper element mounting rods 44a and 44b. In a preferred embodiment, such as the one shown in FIG. 13, wiper element mounting rods 44a and 44b are coaxial or parallel to each other, and are perpendicular to a major axis of pivot arm 73, although the invention is not limited in scope in these regards. Mounting rods 44a and 44b are configured to receive and releasably secure conventional windshield wiper elements 46a and 46b, respectively. As previously discussed, in operation, drive arm 28 will wipe rubber blades carried by wiper elements 46a and 46b across the windshield in a sweeping back and forth motion as is well known.

Specifically, as drive arm 28 is rotated in direction A (as shown in FIG. 13), the rubber blades of wiper elements 46a and 46b are swept across the windshield. The friction that results between the rubber blades and the windshield when drive arm 28 is rotated in direction A causes pivot arm 73 to pivot relative to pivot point 76 in direction B. This movement is arrested when surface 73a of pivot arm 73 contacts inner surface 72c of housing 72. When surface 73a contacts inner surface 72c, mounting rods 44a and 44b are each disposed in a corresponding first angular position relative to drive arm 28. In the embodiment shown, mounting rods 44a and 44b are each caused to disposed in a position which is not perpendicular to drive arm 28.

Instead, mounting rod 44a is disposed in an upper position while mounting rod 44b is disposed in a lower position, wherein each position is defined by its distance from drive arm pivot point 29. For instance, as pivot arm 73 pivots around pivot point 76 in direction B, the distance between mounting rod 44a and drive arm pivot point 29 increases, thus causing wiper element 46a to assume an upper position. Furthermore, as pivot arm 73 pivots around pivot point 76 in direction B, the distance between mounting rod 44b and drive arm pivot point 29 decreases, thus causing wiper element 46b to assume a lower position.

Also, in the embodiment shown, when mounting rods 44a and 44b each assume a corresponding first angular position relative to drive arm 28a, wiper elements 46a and 46b each assume a corresponding first angular position relative to drive arm 28. Thus, when drive arm 28 rotates in a first direction, wiper element 46a travels in a first arcuate path, wherein wiper element 46a is in an upper position and has a corresponding first angular position relative to drive arm 28. Additionally, when drive arm 28 rotates in the same first direction, wiper element 46b travels in a second arcuate path, wherein wiper element 46b is in a lower position and has a corresponding first angular position relative to drive arm 28.

On the return stroke, drive arm 28 is rotated in direction B (as shown in FIG. 13) and the rubber blades of wiper elements 46a and 46b are again swept across the windshield. This time, the friction that results between the rubber blades and the windshield when drive arm 28 is rotated in direction B causes pivot arm 73 to pivot relative to pivot point 76 in direction A. This movement is arrested when surface 73b of pivot arm 73 contacts inner surface 72d of housing 72. When surface 73b contacts inner surface 72d, mounting rods 44a and 44b are each disposed in a corresponding second angular position relative to drive arm 28. In the embodiment shown, mounting rods 44a and 44b are each caused to be disposed in a position which again is not perpendicular to drive arm 28.

Instead, mounting rod 44b is disposed in an upper position while mounting rod 44a is disposed in a lower position, wherein each position is defined by its distance from drive arm pivot point 29. For instance, as pivot arm 73 pivots around pivot point 76 in direction A, the distance between mounting rod 44b and drive arm pivot point 29 increases, thus causing wiper element 46b to assume an upper position. Furthermore, as pivot arm 73 pivots around pivot point 76 in direction B, the distance between mounting rod 44a and drive arm pivot point 29 decreases, thus causing wiper element 46a to assume a lower position.

Also, in the embodiment shown, when mounting rods 44a and 44b each assume a corresponding second angular position relative to drive arm 28, wiper elements 46a and 46b each assume a corresponding second angular position relative to drive arm 28. Thus, when drive arm 28 rotates in a second direction, wiper element 46a travels in a third arcuate path, wherein wiper element 46a is in a lower position and has a corresponding second angular position relative to drive arm 28. Additionally, when drive arm 28 rotates in the same first direction, wiper element 46b travels in a fourth arcuate path, wherein wiper element 46b is in an upper position and has a corresponding second angular position relative to drive arm 28.

Thus, a particular wiper element, when rotated in a first direction, travels in an arcuate path which is different from the arcuate path it travels when rotated in a second direction. Furthermore, the two arcuate paths (one for each direction travelled by drive arm 28) which are travelled by a first wiper element are different from both of the arcuate paths which are travelled by the second wiper element. This plurality of arcuate paths travelled by the wiper elements permits the wiper elements to remove streaks left behind by windshield wiper systems of the prior art.

It is also noted that, according to one embodiment of the present invention, the windshield wiper illustrated in FIG. 12 employs a single pivot, and may operate on the principles disclosed above. In this embodiment, pivot members 34 are rigidly attached to drive arm attachment member 12 and to support members 32. Thus, drive arm attachment member 12 pivots relative to drive arm 28 around screw 60. This embodiment also provides that a particular wiper element, when rotated in a first direction, travels in an arcuate path which is different from the arcuate path it travels when rotated in a second direction, and that the two arcuate paths (one for each direction travelled by drive arm 28) which are travelled by a first wiper element are different from both of the arcuate paths which are travelled by the second wiper element. As previously mentioned, this plurality of arcuate paths travelled by the wiper elements permits the wiper elements to remove streaks left behind by windshield wiper systems of the prior art.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirt of the invention. It is the intention, therefore, to be limited only as indicated by the scope of the claims appended hereto.

It is to be understood that the drawings are not necessarily drawn to scale, but that they are merely conceptual in nature.

What is claimed is:

1. In a windshield wiper system which includes a wiper drive arm pivotably mounted proximate a vehicle windshield, said wiper arm supporting a pair of wiper elements via a wiper apparatus, said apparatus comprising:
    a drive arm attachment member non-rotatably coupled via a wiper drive arm receiving portion with said wiper drive arm and comprising a pivot arm pivotably secured to said drive arm attachment member about a pivot axis which intersects said windshield, said pivot arm carrying said pair of wiper elements, wherein said pair of wiper elements are configured to pivot about said pivot axis which intersects said windshield such that each of said wiper elements moves over a corresponding first arcuate path when said drive arm is rotated in a first direction and moves over a corresponding second arcuate path when said drive arm is rotated in a direction opposite said first direction, wherein each of said first and second paths of a first wiper element is different from each of said first and second paths of a second wiper element.

2. The apparatus according to claim 1, wherein each of said wiper elements moves between a corresponding upper position when said drive arm is rotated in said first direction, and a corresponding lower position when said drive arm is rotated in said opposite direction.

3. The apparatus according to claim 2, wherein said pivot arm is configured such that when one of said pair of wiper elements is in said upper position, said other one of said pair of wiper elements is in said lower position.

4. The apparatus according to claim 1, wherein each of said wiper elements moves between a corresponding first angular position when said drive arm is rotated in said first direction, and a corresponding second angular position when said drive arm is rotated in said opposite direction.

5. The apparatus according to claim 1, wherein said pivot arm further comprises a pair of mounting rods configured to carry said wiper elements.

6. The apparatus according to claim 5, wherein said pair of mounting rods are perpendicular to said pivot arm.

7. The apparatus according to claim 5, wherein said pair of mounting rods are coaxial.

8. The apparatus according to claim 1, wherein said pair of wiper elements are parallel to each other.

9. The apparatus as recited in claim 1, wherein said drive arm attachment member is releasably secured to said drive arm at said receiving portion.

10. A windshield wiper system comprising:
    a vehicle windshield,
    a wiper drive arm pivotably mounted proximate said vehicle windshield;
    a pair of wiper elements;
    a drive arm attachment member non-rotatably coupled via a wiper drive arm receiving portion with said wiper drive arm; and
    a pivot arm pivotably secured to said drive arm attachment member about a pivot axis which intersects said windshield, said pivot arm carrying said pair of wiper elements such that each of said wiper elements moves over a corresponding first arcuate path when said drive arm is rotated in a first direction and moves over a corresponding second arcuate path when said drive arm is rotated in an opposite direction, wherein each of said first and second paths of a first wiper element is different from each of said first and second paths of a second wiper element.

11. The apparatus according to claim 10, wherein each of said wiper elements moves between a corresponding upper position when said drive arm is rotated in said first direction, and a corresponding lower position when said drive arm is rotated in said opposite direction.

12. The apparatus according to claim 11, wherein said pivot arm is configured such that when one of said pair of wiper elements is in said upper position, said other one of said pair of wiper elements is in said lower position.

13. The apparatus according to claim 10, wherein each of said wiper elements moves between a corresponding first angular position when said drive arm is rotated in said first direction, and a corresponding second angular position when said drive arm is rotated in said opposite direction.

14. The apparatus according to claim 10, wherein said pivot arm further comprises a pair of mounting rods configured to carry said wiper elements.

15. The apparatus according to claim 14, wherein said pair of mounting rods are perpendicular to said pivot arm.

16. The apparatus according to claim 14, wherein said pair of mounting rods are coaxial.

17. The apparatus according to claim 10, wherein said pair of wiper elements are parallel to each other.

18. The apparatus as recited in claim 10, wherein said drive arm attachment member is releasably secured to said drive arm at said receiving portion.

* * * * *